(12) United States Patent
Kawazoe et al.

(10) Patent No.: US 7,144,943 B2
(45) Date of Patent: *Dec. 5, 2006

(54) PROCESS FOR PRODUCTION OF MODIFIED CARBON BLACK FOR RUBBER REINFORCEMENT AND PROCESS OF PRODUCTION OF RUBBER COMPOSITION CONTAINING MODIFIED CARBON BLACK

(75) Inventors: Masayuki Kawazoe, Hiratsuka (JP); Tetsuji Kawazura, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 174 days.

This patent is subject to a terminal disclaimer.

(21) Appl. No.: 10/725,058

(22) Filed: Dec. 2, 2003

(65) Prior Publication Data

US 2004/0119190 A1 Jun. 24, 2004

Related U.S. Application Data

(62) Division of application No. 09/147,441, filed as application No. PCT/JP98/00567 on Feb. 12, 1998.

(30) Foreign Application Priority Data

| Apr. 30, 1997 | (JP) | ................................... 9-112626 |
| Apr. 30, 1997 | (JP) | ................................... 9-112905 |
| Jun. 2, 1997 | (JP) | ................................... 9-144225 |
| Jun. 4, 1997 | (JP) | ................................... 9-146796 |
| Jul. 31, 1997 | (JP) | ................................... 9-206901 |
| Aug. 20, 1997 | (JP) | ................................... 9-224082 |

(51) Int. Cl.
*B60C 1/00* (2006.01)
*C09C 1/56* (2006.01)
*C09C 1/44* (2006.01)
*C08K 3/34* (2006.01)
*C08K 5/24* (2006.01)

(52) U.S. Cl. ...................... 524/493; 524/261; 264/117; 106/475

(58) Field of Classification Search ................ 524/493, 524/261; 264/117; 106/475
See application file for complete search history.

(56) References Cited

U.S. PATENT DOCUMENTS

| 2,457,962 | A | | 1/1949 | Whaley |
| 3,390,006 | A | * | 6/1968 | Takewell et al. ............. 106/475 |
| 3,491,052 | A | * | 1/1970 | Hare et al. ................... 523/323 |
| 4,430,280 | A | * | 2/1984 | Kreher et al. ................ 264/117 |
| 5,789,509 | A | * | 8/1998 | Schmiegel ................... 526/247 |
| 6,652,641 | B1 | * | 11/2003 | Kawazura ................... 106/475 |
| 2001/0009654 | A1 | * | 7/2001 | Kawazoe et al. ......... 423/449.2 |

FOREIGN PATENT DOCUMENTS

| JP | 5-132307 | 5/1993 |
| JP | 6-210631 | 8/1994 |
| JP | 8-277347 | 10/1996 |
| JP | 9-118780 | 5/1997 |
| JP | 9-118781 | 5/1997 |
| JP | 9-296071 | 11/1997 |
| JP | 10-25428 | 1/1998 |
| JP | 10-30066 | 2/1998 |
| US | EP-1321488 A1 * | 6/2003 |

OTHER PUBLICATIONS

"Rubber Technology", Maurice Morton, 3$^{rd}$ Ed.,1999, p. 69-70.*

* cited by examiner

*Primary Examiner*—David W. Wu
*Assistant Examiner*—Ives Wu
(74) *Attorney, Agent, or Firm*—Arent Fox PLLC

(57) ABSTRACT

A process for production of a modified carbon black, at a cheaper cost, for rubber reinforcement having the superior tan δ temperature dependency of silica and an excellent abrasion resistance and further having no problems arising due to a low electrical conductivity is provided.

In the process for production of a modified carbon black for rubber reinforcement wherein, in the step of granulating the carbon black, a water-dispersed silica is added to the carbon black, the granulating is performed by a granulator and a process of production of a rubber composition containing a surface-treated carbon black for rubber reinforcement comprising coagulating, with a coagulating agent, a mixture of (a) 100 parts by weight, as a solid content, of a diene rubber component and (b) 10 to 250 parts by weight, as a solid content, of a slurry containing a carbon black for rubber reinforcement or (b') 10 to 250 parts by weight of a modified carbon black produced by the above method.

8 Claims, No Drawings

PROCESS FOR PRODUCTION OF MODIFIED CARBON BLACK FOR RUBBER REINFORCEMENT AND PROCESS OF PRODUCTION OF RUBBER COMPOSITION CONTAINING MODIFIED CARBON BLACK

This is a Division of application Ser. No. 09/147,441, filed Mar. 2, 1999, which is a §371 of International Patent Application No. PCT/JP98/00567, filed Feb. 12, 1998. The disclosure of the prior applications are hereby incorporated by reference herein in its entirety.

TECHNICAL FIELD

The present invention relates to a process for production of a modified carbon black for rubber reinforcement (hereinafter sometimes simply referred to as "modified carbon black"). More specifically, the present invention relates to a process for production of a modified carbon black for rubber reinforcement which has amorphous silica adhered to the surface thereof. The modified carbon black thus obtained for rubber reinforcement can be formulated into rubber compositions for various types of rubber products such as rubber compositions for tires and also for belt conveyors and industrial rolls, to provide superior rubber physical properties such as abrasion resistance, grip performance, and low rolling resistance (i.e., low heat buildup) and can be produced, without any major changes in the conventional carbon black production facilities, and therefore, can be produced at a low cost.

The present invention also relates to a process for production of a rubber composition containing the modified carbon black for rubber reinforcement. More specifically, it relates to a process for production of a rubber master batch composition containing a diene rubber and a modified carbon black for rubber reinforcement which has a water-dispersed silica adhered to its surface. The rubber composition containing this modified carbon black for rubber reinforcement can be used for various types of rubber products such as tire materials such as the cap treads and side treads of tires, and also belt conveyors, industrial rubber rolls, and hoses.

BACKGROUND ART

Reinforcing fillers such as carbon black and silica have long been used for reinforcing rubber as is well known. In the rubber industry, such as the tire industry, the practice has been to mix the carbon black used for rubber reinforcement with the rubber in advance using the wet carbon black master batch method so as to simplify mixing step of the carbon black with the rubber and to improve the dispersion of the carbon black in the rubber (for example, see Japanese Unexamined Patent Publication (Kokai) No. 59-49247 and Japanese Unexamined Patent Publication (Kokai) No. 63-43937). However, in recent years, the development of superior silane coupling agents has led to formulation of silica instead of carbon black. Since silica, as compared with carbon black, has properties of providing a low tan $\delta$ at high temperatures (i.e., around 60° C.) and a high tan $\delta$ at low temperatures (i.e., around 0° C.), when used for rubber compositions for tire treads for example, a tire having a low rolling resistance and a high gripping power can be advantageously produced. However, silica is inferior to carbon black in the abrasion resistance and the low electrical conductivity, and therefore, if used for tires, there is the problem that the tire will pick up a charge when driven on and will cause various problems such as noise and, in some cases, even misoperation in electronic equipments such as radios.

Covering the surface of a pigment, etc. with silica etc. to improve the dispersion and to increase weather resistance has been proposed in, for example, Japanese Examined Patent Publication (Kokoku) No. 50-14254 and Japanese Examined Patent Publication (Kokoku) No. 7-30269. For example, Japanese Examined Patent Publication (Kokoku) No. 7-30269 discloses a method of treating the surface of carbon black used for a powder paint comprising the steps of dispersing carbon black in water, adjusting the pH to 6 or more, and, while maintaining the temperature at least at 70° C., precipitating amorphous silica on the surface of the particles of carbon black using sodium silicate. However, none of these publications discloses the deposition of silica on the surface of the carbon black used for reinforcing rubber. Further, Japanese Unexamined Patent Publication (Kokai) No. 8-277347 discloses the adhesion of silica to the surface of carbon black used for rubber reinforcement, but the industrially efficient production process is not disclosed at all.

When formulating silica into a rubber composition, the silica is difficult to disperse during the mixing, and therefore, a large amount of labor work is required in the mixing process, and therefore, production of master batches as in the case of carbon black is desired. However, since silica has a coagulating pH (i.e., about 4 to 7) different from the coagulating pH region (i.e., about 2.5 to 3) of rubber latex and for other reasons, a wet silica master batch has not been satisfactorily produced.

DISCLOSURE OF THE INVENTION

Accordingly, an object of the present invention is to provide a process for simply and cheaply producing a granulated (beaded) modified carbon black for reinforcement of rubber having a superior tan $\delta$ temperature dependency of silica and an excellent abrasion resistance and processability and further having no problems caused by a low electrical conductivity, without largely changing the existing carbon black production facilities.

Another object of the present invention is to provide a process for producing a rubber composition containing silica-modified carbon black for rubber reinforcement having the superior tan $\delta$ temperature dependency of silica and an excellent abrasion resistance and processability and further having no problems caused by a low electrical conductivity and can also be simply and inexpensively produced.

In accordance with the present invention, there is provided a process for producing a modified carbon black for rubber reinforcement comprising, in the step of granulating a carbon black when producing the modified carbon black for rubber reinforcement, granulating the carbon black in a granulator after or while adding water-dispersed silica to the carbon black.

In accordance with the present invention, there is also provided a process for producing a rubber composition comprising:
 mixing (a) 100 parts by weight, in terms of a solid content, of a diene rubber component and (b) 10 to 250 parts by weight, in terms of a solid content, of a slurry containing a carbon black for rubber reinforcement; and
 coagulating the resultant mixture with a coagulating agent.

In accordance with the present invention, there is further provided a process for producing a rubber composition comprising mixing (a) 100 parts by weight, in terms of a solid content, of a latex of a diene rubber component and (b') 10 to 250 parts by weight of a modified carbon black produced by the above method; and coagulating the resultant mixture with a coagulating agent.

BEST MODE FOR CARRYING OUT THE INVENTION

The present inventors engaged in intensive studies on a process for production of a modified carbon black for rubber reinforcement having, as mentioned above, a superior tan δ temperature dependency of silica, excellent abrasion resistance, and further having no problems derived from a low electrical conductivity and, as a result, found that it was possible to produce the desired modified carbon black for rubber reinforcement by adding a water-dispersed silica instead of the granulating solution (i.e., normally water and a binder) added at the time of granulating.

As the carbon black for rubber reinfocement used as the starling material for production of a modified carbon black lbr rubber reinrorcement in the present invention, it is possible to use any carbon black which is generally used in the past for tires and other rubber compositions. Preferable carbon blacks are the SRF to SAF grades. Preferable carbon blacks may also include, for example, genera-purpose furnace (GPF) to super-abrasion furnace (SAF) grades. It is possible to use the same differently or blend two or more types depending on the application of the rubber composition.

A general method for producing a modified carbon black for rubber reinforcement according to the present invention will be explained below. First, as the water-dispersed silica, it is possible to use those produced by mixing and reacting a metal silicate salt and an acid. The form of the water-dispersed silica (e.g., it may be either a sol or a gel) and the concentration of the silica in the water-dispersed silica are not particularly limited, but a sol type silica in which the silica particles exist independently is preferred. A silica concentration of 50,000 ppm or less, which is stable for a sol, is suitable. Further, as the water-dispersed silica, it is also possible to use a commercially available water-dispersed silica. As a commercially available water-dispersed slurry, those having a diameter of the silica particles contained of from 1 to 100 nm are preferred, more preferably those having a diameter of 5 to 80 nm, and having a sodium ion of 1.0% by weight or less, in terms of $Na_2O$ are preferred. This type water-dispersed silica is composed of primary particles or aggregates containing plural primary particles dispersed in water. Usually, the electrolyte content is extremely small, and therefore, it is stabilized in a basic state containing a high concentration of silica. Thus, the water-dispersed silica may be particularly suitably used when the silica content is intended to be increased in modified carbon. In the present invention, when producing a modified carbon black, the water-dispersed silica can be added, without particularly adjusting the pH thereof, but it is also possible, for example to add an acid to adjust the neutral conditions to prevent the gelation of the silica or to prevent the corrosion of the granulator. Thereafter, the silica is mixed with the carbon black, whereby the composite of the carbon black is formed.

The characteristic feature of the present invention resides in the fact that the water-dispersed silica is added before or during the granulating step (either continuous type or batch type) used for producing a normal or ordinary carbon black to produce a modified carbon black composed of carbon black having silica is adhered to the surface thereof.

Normally, water-dispersed silica having a silica concentration of 50,000 ppm or less, preferably from 2,500 to 50,000 ppm, is prepared preferably in an amount of 50 to 1000% by weight of carbon black, depending on the amount of the carbon black supplied, an acid (e.g., sulfuric acid, hydrochloric acid) is added thereto to bring it to the neutral region, then this is added to the carbon black in a granulator.

The carbon black added with the water-dispersed silica in the above way may be stirred, granulated, and modified at a suitable temperature (e.g., 60° C. to 200° C.) using, for example, a pin type screw granulator etc. The amount of the water-dispersed silica added to the carbon black is not particularly limited, but preferably is, in terms of $SiO_2$, 0.1 to 50% by weight, more preferably 0.5 to 30% by weight, based upon the weight of the carbon black.

The rubber composition containing the modified carbon black for rubber reinforcement according to the present invention may be produced, for example, in the following way. That is, the rubber reinforcement carbon black and the water-dispersed silica are mixed to make a slurry. To improve the dispersibilily of the carbon black, a suitable dispersing agent (e.g., methanol and various surfactants) may also be added. When the pH of this mixture is adjusted to a region where the water-dispersed silica particles cannot exist independently (e.g., pH of about 7), a modified carbon black having silica adhered to the carbon black is obtained. The slurry thus obtained is mixed with the rubber latex. Note that the amount of silica adhered to the surface of the carbon black is not particularly limited, but preferably is 0.1 to 25% by weight, in terms of $SiO_2$, based upon the weight of the silica-modified carbon black. If the amount of the silica adhered is too large, the coagulation with the rubber latex tends to become difficult. Further, it is possible to add the water-dispersed silica to the carbon black, then to granulate the carbon black in a granulating step and make a slurry by an ordinary method, then to mix the resultant modified carbon black with a latex of the diene rubber component to obtain a mixture.

The mixture thus obtained of the rubber latex and the modified carbon black slurry may be used to produce a rubber composition containing the modified carbon black for rubber reinforcement of the present invention by coagulation by an ordinary method. As the coagulating agent, general coagulating agents, for example, an acid such as sulfuric acid and formic acid, an electrolyte such as sodium chloride, a polymer coagulating agent may be used (these may also be used together). The amount added is the same as in the past, for example, an amount required for adjusting the pH value of the system to 3 to 6.

According to the present invention, the modified carbon black for rubber reinforcement can be formulated into a cross-linkable component such as a diene rubber to obtain a rubber composition superior in abrasion resistance, grip performance, rolling resistance, etc. As such a cross-linkable rubber, natural rubber (NR), various butadiene rubbers (BR), various styrene-butadiene copolymers (SBR), polyisoprene rubber (IR), butyl rubber (IIR), acrylonitryl-butadiene rubber, chloroprene rubber, ethylene-propylene copolymer rubber, ethylene-propylene-diene copolymer rubber, styrene-isoprene copolymer rubber, styrene-isoprene-butadiene copolymer rubber, isoprene-butadiene copolymer rubber, chlorosulfonated polyethylene, acryl rubber, epichlorohydrin rubber, polysulfide rubber, silicone rubber, fluororubber, urethane rubber, etc. may be exemplified. These may be used alone or in any blend thereof. When a blend is used, the ratio of the blend is not particularly limited.

The composition according to the present invention containing the modified carbon black for rubber reinforcement includes, as a solid content, 10 to 250 parts by weight of the modified carbon black for rubber reinforcement, more preferably 15 to 200 parts by weight, still more preferably 15 to 150 parts by weight, based upon 100 parts by weight of the rubber component. If the amount formulated is too small, when used for various rubber products, since the amount of the modified carbon black for rubber reinforcement normally required (i.e., 10 parts or more) cannot be formulated, sufficient reinforcement is not possible and, for example, the abrasion resistance etc. deteriorate. Conversely, if too large, there is the danger of the hardness becoming too high, the processability falling, or the usefulness as a rubber material otherwise becoming poorer. It is also possible to use in the rubber composition any carbon black and/or silica normally formulated into rubber compositions, in addition to the above water-dispersed silica-modified carbon black.

The rubber composition may also have suitably formulated into it, in addition to the above rubber, modified carbon black having the silica adhered to or deposited on its surface, etc., any additives normally used in the rubber industry such as sulfur, organic peroxides, softening agents, antioxidants, vulcanization accelerators, fillers, plasticizers, silane coupling agents, etc., if necessary, in an ordinary used amount.

The rubber composition containing the modified carbon black for rubber reinforcement of the present invention may be produced by the same method as the ordinary wet carbon black master batch method. A slurry of carbon black which has silica adhered to the surface thereof is produced by the above method, then this is mixed with a diene rubber latex (e.g., SBR latex) in a suitable ratio. Next, a coagulating agent (e.g., a polymer coagulating agent, NaCl, etc.) generally used for the production of a carbon black master batch, etc. in the past is added for coagulation. The coagulated rubber composition is separated from the aqueous phase and the moisture is removed by, for example, drying by hot air to obtain the desired rubber master batch composition. Note that it is also possible to add an additive such as an antioxidant process oil or silane coupling agent during the above process if necessary.

The modified carbon black for rubber reinforcement used in the present invention is produced as explained above by, for example, causing water-dispersed silica to adhere to the surface of the carbon black in a carbon black slurry, and therefore, the modified carbon black exists in a slurry state. Accordingly, it is also possible to produce the rubber composition of the present invention by mixing this slurry directly with the rubber latex. This eliminate the labor in the step of mixing the silica with the rubber and results in good dispersion of the modified carbon black for rubber reinforcement into the rubber. Further, it eliminates the step of recovering and drying the modified carbon black for rubber reinforcement from the slurry, and therefore, further contributes to the reduction of the production costs.

In a preferred aspect of the present invention, at the time of the above wet mixing, a process oil such as aromatic oil, paraffinic oil, or naphthalenic oil and/or a synthetic plasticizer, liquid rubber, or other liquid generally used in formulating rubber in the past may be formulated into the mixture in an amount of 10 to 200 parts by weight based upon 100 parts by weight of the diene rubber.

EXAMPLES

The present invention will be explained below in further detail using Examples, but the invention is of course not restricted to these Examples in scope.

Examples I-1 to I-6 and Comparative Examples I-1 to I-2

Preparation of Water-Dispersed Silica-Modified Carbon Black

The water-dispersed silica-modified carbon black was produced by the following method.

As the carbon black, two types of HAF (N339) and ISAF (N220) grades shown in Table I-1 were used. As the water-dispersed silica, a predetermined amount of aqueous JIS No. 1 sodium silicate solution and an amount of dilute sulfuric acid for neutralizing the same were added to water adjusted to pH 10 with sodium hydroxide so as to finally obtain three types of sol type water-dispersed silica containing 0.5, 2.5, and 5% by weight of $SiO_2$.

The carbon blacks thus obtained were formed in a reaction furnace, trapped by a bag filter, and transferred to the granulating step. Immediately before the carbon black was introduced into the granulator (i.e., pin type screw granulator), two times the amount of the 0.5, 2.5, or 5% by weight water-dispersed silica as the amount of the carbon black was sprayed uniformly over the carbon black as a whole. Next, the carbon black was conveyed to a granulator (i.e., pin type screw granulator) and granulated by the usual method to obtain the modified carbon black. The temperature of the modified carbon black directly after emerging from the granulator (i.e., pin type screw granulator) was about 70 to 80° C.).

Methods for Measurement of Properties of Modified Carbon Black

1) Silica Content

A sample of the modified carbon black was calcified at 600° C. in an electric furnace, the resultant ash was filtered and washed with distilled water to remove the salt, then was fluorinated. The decrease in the weight was treated as the silica content. This was shown as a percentage by weight against the original modified carbon.

2) Nitrogen Adsorption Specific Area ($N_2SA$)

This was measured according to a method of ASTM D3037.

3) Amount of Iodine Absorption

This was measured according to JIS K6221.

Methods for Measurement of Physical Properties of Rubber

Various rubber compositions were prepared by an ordinary method by mixing in a Banbury mixer and rolls according to the following Formulation Table (i.e., vulcanization conditions: 160° C.×30 minutes)

| Formulation Table | |
|---|---|
| SBR1502[1]: | 100 parts by weight |
| Reinforcing filler: | 50 parts by weight |
| Silane coupling agent[2]: | 3 parts by weight[3] |
| Zinc white (JIS No. 3): | 3 parts by weight |
| Stearic acid: | 2 parts by weight |
| Antioxidant[4]: | 2 parts by weight |

-continued

Formulation Table

| Powdered sulfur: | 2 parts by weight |
|---|---|
| Vulcanization accelerator*[5]: | 1 part by weight |

*[1]Nipol 1502 (made by Nippon Zeon)
*[2]Si69 (made by Degussa)
*[3]Not used when the reinforcing filler is carbon black.
*[4]Santoflex 13 (made by Monsanto)
*[5]Santocure NS (made by Monsanto)

1) Tensile Strength

This was measured according to a method of JIS K6301

2) Abrasion Resistance Index

A Lambourn abrasion tester was used for measurement under conditions of a load of 5 kg, a slip rate of 25%, a time of 4 minutes, and room temperature and the loss due to abrasion was indicated as an index. Note that the larger the figure, the better the abrasion resistance.

3) tan δ

This was measured using a viscoelasticity spectrometer made by Toyo Seiki Seisakusho under an amplitude of ±2%, a frequency of 20 Hz, and a static stress of 10%.

4) Volume Resistivity

This was measured according to ASTM D991 or JIS K6911.

Compositions were prepared by the types of reinforcing fillers and formulations shown in the formulation table. The results of evaluation of the rubber compositions obtained are shown in Table I-1.

Examples I-7 to I-30 and Comparative Examples I-3 to I-6

The same procedure was followed as in Examples I-1 to I-6 to prepare rubber compositions except for using the commercially available water-dispersed silicas a to f shown in Table I-2 for the preparation of the modified carbon black for rubber reinforcement. The results of evaluation obtained according to the Formulation Table of the rubber compositions shown below are shown in Table I-3.

Formulation Table

| Natural rubber*[1]: | 50 parts by weight |
|---|---|
| Solution polymerized SBR*[2]: | 50 parts by weight |
| Reinforcing filler: | 50 parts by weight |
| Silane coupling agent*[3]: | 2.5 parts by weight*[4] |
| Zinc white (JIS No. 3): | 3 parts by weight |
| Stearic acid: | 2 parts by weight |
| Antioxidant*[5]: | 3 parts by weight |
| Powdered sulfur: | 2 parts by weight |
| Vulcanization accelerator*[6]: | 1 part by weight |

*[1]SMR-5L
*[2]NS-116 (made by Nippon Zeon)
*[3]Si69 (made by Degussa)
*[4]Not used when reinforcing filler is carbon black.
*[5]Santoflex 13 (made by Monsanto)
*[6]Santocure NS (made by Monsanto)

TABLE I-1

| | Comp. Ex. I-1 | Ex. I-1 | Ex. I-2 | Ex. I-3 | Comp. Ex. I-2 | Ex. I-4 | Ex. I-5 | Ex. I-6 |
|---|---|---|---|---|---|---|---|---|
| Type of carbon black | N339*[1] | N339*[1] | N339*[1] | N339*[1] | N220*[2] | N220*[2] | N220*[2] | N220*[2] |
| Silica modification | No | Yes | Yes | Yes | No | Yes | Yes | Yes |
| Carbon properties | | | | | | | | |
| Am't of silica (wt %) | 0 | 1.0 | 5.1 | 10.0 | 0 | 0.9 | 5.3 | 10.2 |
| $N_2SA$ (m$^2$/g) | 94 | 93 | 101 | 105 | 111 | 115 | 120 | 123 |
| Iodine absorption (mg/g) | 90 | 85 | 74 | 62 | 117 | 111 | 98 | 90 |
| Rubber physical properties | | | | | | | | |
| tan δ (0° C.) | 0.303 | 0.297 | 0.297 | 0.298 | 0.338 | 0.335 | 0.334 | 0.333 |
| tan δ (60° C.) | 0.185 | 0.152 | 0.155 | 0.162 | 0.202 | 0.182 | 0.185 | 0.190 |
| Abrasion resistance index | 100 | 103 | 102 | 102 | 100 | 103 | 103 | 104 |
| Volume resistivity (Ωcm) | $1.02 \times 10^2$ | $1.03 \times 10^2$ | $1.08 \times 10^2$ | $1.10 \times 10^2$ | 1.8 | 1.8 | 2.2 | 2.8 |

*[1]HAF grade (N339: Seast KH, made by Tokai Carbon).
*[2]ISAF grade (N220: DIA BLACK N220, made by Mitsubishi Chemical).

TABLE I-2

Properties of water-dispersed silica used

| | Silica particle size (nm) | pH | $SiO_2$ (%) | $Na_2O$ (%) | Commercial grade name | Manufacturer |
|---|---|---|---|---|---|---|
| a | 15 | 9.8 | 20.4 | 0.16 | Snowtex 20 | Nissan Chemical |
| b | 15 | 8.7 | 20.3 | 0.0003 | Snowtex C | Nissan Chemical |
| c | 10 | 9.7 | 30.4 | 0.40 | Snowtex S | Nissan Chemical |
| d | 50 | 10.9 | 20.3 | 0.12 | Snowtex 20L | Nissan Chemical |
| e | 76 | 9.3 | 40.2 | 0.00056 | Snowtex ZL | Nissan Chemical |
| f | 20 (lenear) | 10.3 | 20.3 | 0.28 | Snowtex UP | Nissan Chemical | generally known. When using these to treat carbon black, it is necessary to dilute them to a suitable concentration before use in view of the amount of silica to be adhered to the carbon black and the amount of water required for the granulating solution. For example, when using a water-dispersed silica having a silica content of 20% by weight to adhere or deposit 1% by weight of silica to or on the carbon black, it is sufficient to add approximately 0.05 kg of the water-dispersed silica based upon 1 kg of carbon black. For granulating, however, it is necessary to dilute this by adding the amount of shortage of water since about the same amount of water as the carbon black is normally required. The concentration of water-dispersed silica thus prepared for granulating may further contain a binder ingredient such as molasses normally used for granulating carbon black, if necessary.

From the facts that the modified carbon black prepared by the above method does not show any independent spherical silica when observed under an electron microscope, but shows an amorphous substance not having the lamellar-like

TABLE I-3

| | Comp. Ex. I-3 | Comp. Ex. I-4 | Ex. I-7 | Ex. I-8 | Ex. I-9 | Ex. I-10 | Ex. I-11 | Ex. I-12 | Ex. I-13 | Ex. I-14 | Ex. I-15 | Ex. I-16 | Ex. I-17 | Ex. I-18 |
|---|---|---|---|---|---|---|---|---|---|---|---|---|---|---|
| Carbon black | N339 | N339 | N339 | N339 | N339 | N339 | N339 | N339 | N339 | N339 | N339 | N339 | N339 | N339 |
| Water-dispersed silica | — | — | a | b | c | d | e | f | a | b | c | d | e | f |
| | | | | | | <---added to carbon with no pH adjustment---> | | | | | | | | |
| $N_2SA$ (m²/g) | 94 | 94 | 91.08 | 93.43 | 85.53 | 85.61 | 94.00 | 83.34 | 86.59 | 87.38 | 88.45 | 81.65 | 84.64 | 86.35 |
| Iodine absorption (mg/g) | 89 | 89 | 72.55 | 77.74 | 86.48 | 86.19 | 87.28 | 82.54 | 78.42 | 83.55 | 90.29 | 85.07 | 85.78 | 63.70 |
| Silica content (wt %) | 0 | 0 | 1 | 1 | 1 | 1 | 1 | 1 | 1 | 1 | 1 | 1 | 1 | 1 |
| Si69 formulation (phr)*1 | 0 | 2.5 | 2.5 | 2.5 | 2.5 | 2.5 | 2.5 | 2.5 | 2.5 | 2.5 | 2.5 | 2.5 | 2.5 | 2.5 |
| tan δ (0° C.) | 0.503 | 0.514 | 0.518 | 0.532 | 0.533 | 0.522 | 0.524 | 0.527 | 0.533 | 0.539 | 0.528 | 0.523 | 0.514 | 0.524 |
| tan δ (60° C.) | 0.184 | 0.177 | 0.162 | 0.165 | 0.169 | 0.17 | 0.162 | 0.161 | 0.155 | 0.165 | 0.169 | 0.163 | 0.166 | 0.161 |
| Abrasion resistance index | 101 | 102 | 99 | 103 | 99 | 104 | 97 | 108 | 107 | 103 | 97 | 95 | 97 | 107 |

| | Comp. Ex. I-5 | Comp. Ex. I-6 | Ex. I-19 | Ex. I-20 | Ex. I-21 | Ex. I-22 | Ex. I-23 | Ex. I-24 | Ex. I-25 | Ex. I-26 | Ex. I-27 | Ex. I-28 | Ex. I-29 | Ex. I-30 |
|---|---|---|---|---|---|---|---|---|---|---|---|---|---|---|
| Carbon black | N220 | N220 | N220 | N220 | N220 | N220 | N220 | N220 | N220 | N220 | N220 | N220 | N220 | N220 |
| Water-dispersed silica | — | — | a | b | c | d | e | f | a | b | c | d | e | f |
| | | | | | | <---added to carbon without pH adjustment---> | | | | | | | | |
| $N_2SA$ (m²/g) | 111 | 111 | 103.47 | 104.29 | 104.48 | 102.91 | 114.11 | 104.61 | 104.17 | 104.63 | 105.75 | 102.92 | 102.20 | 105.43 |
| Iodine absorption (mg/g) | 116 | 116 | 75.21 | 120.56 | 109.42 | 103.47 | 117.28 | 115.36 | 114.87 | 110.95 | 114.65 | 114.26 | 116.14 | 116.61 |
| Silica content (wt %) | 0 | 0 | 1 | 1 | 1 | 1 | 1 | 1 | 1 | 1 | 1 | 1 | 1 | 1 |
| Si69 formulation (phr)*1 | 0 | 2.5 | 2.5 | 2.5 | 2.5 | 2.5 | 2.5 | 2.5 | 2.5 | 2.5 | 2.5 | 2.5 | 2.5 | 2.5 |
| tan δ (0° C.) | 0.533 | 0.540 | 0.544 | 0.548 | 0.548 | 0.537 | 0.547 | 0.547 | 0.540 | 0.547 | 0.551 | 0.540 | 0.552 | 0.549 |
| tan δ (60° C.) | 0.220 | 0.204 | 0.183 | 0.185 | 0.182 | 0.189 | 0.188 | 0.187 | 0.185 | 0.188 | 0.181 | 0.186 | 0.180 | 0.181 |
| Abrasion resistance index | 103 | 102 | 103 | 105 | 105 | 102 | 109 | 106 | 103 | 110 | 113 | 112 | 109 | 110 |

*1Parts per 100 parts by weight of rubber.

Note that the modified carbon was produced as follows:

In commercially available water-dispersed silica, a high concentration of spherical silica particles is stabilized in the relatively high pH alkaline region. For example, those having a concentration of silica of about 10 to 50% are structure characteristic of carbon black on the surface of the carbon and that analysis of the ash obtained by incineration shows that a predetermined amount of silica is contained, it is observed that at least a part of the water-dispersed silica forms a composite with the carbon black.

Examples II-1 to II-7 and Comparative Examples II-1 to II-2

Preparation of Modified Carbon Black for Rubber Reinforcement (Example II-1)

A mixed slurry was obtained by using 100 g of carbon black for rubber reinforcement (N339) and adding 2 liters of water-dispersed silica. For the water-dispersed silica, a predetermined amount of aqueous JIS No. 1 sodium silicate solution and an amount of dilute sulfuric acid for neutralizing the same were added to water adjusted to pH 10 by sodium hydroxide so as to finally obtain a sol type water-dispersed silica containing 0.5% by weight of $SiO_2$.

The water-dispersed silica slurry thus obtained of the carbon black obtained above was heated to 90° C. and adjusted to pH 7 to obtain the desired slurry-like substance containing the modified carbon black (i.e., solid content of 5.2% by weight).

Preparation of Modified Carbon Black for Rubber Reinforcement (Example II-2 to II-7)

Using a commercially available water-dispersed silica (see Table II-3), modified carbon black for rubber reinforcement was produced in the following way. The commercially available water-dispersed silica shown in Table II-3 was diluted with a suitable amount of water and mixed with ungranulated carbon black (N339) in an amount equal to the weight of the carbon and so that the content of silica in each case became 1% by weight of the total weight of the carbon black and silica, then the mixture was granulated by an ordinary carbon black granulator (i.e., pin type screw granulator) at approximately 80° C. This was dried at approximately 105° C. to obtain the modified carbon black for rubber reinforcement shown in Table II-2.

Preparation of Rubber Composition Containing Modified Carbon Black (Examples II-1 to II-7)

Next, the modified carbon black obtained above was made into a slurry (concentration of 12.5% by weight). 200 g of this and 125 g of SBR 1502 latex (concentration of 41% by weight) were mixed, 1000 g of saline (concentration of 3% by weight) was added to this as a coagulating agent, the mixture was stirred at a temperature of 50° C. for 0.5 hour, then the resultant mixture was dried at 80° C. for 24 hours to obtain a rubber composition containing a modified carbon black for rubber reinforcement (i.e., master batches 1 to 7).

Measurement of Silica Content of Modified Carbon Black for Rubber Reinforcement

A sample of the modified carbon black was calcified at 600° C. in an electric furnace, then the ash was fluorinated. The reduction in weight was treated as the silica content adhered. Amounts of silica of 10% by weight and 1% by weight were confirmed as the percentage by weight against the original modified carbon.

Various rubber compositions were prepared by an ordinary method by mixing in an internal mixer and rolls according to the following formulation table (vulcanization conditions: 160° C.×30 minutes). The results are shown in Table II-1.

| Formulation Table | |
| --- | --- |
| Diene rubber (SBR1502): | 100 parts by weight*[1] |
| Reinforcing filler (see Table II-1): | 50 parts by weight*[1] |
| Silane coupling agent*[2]: | 3 parts by weight*[3] |
| Zinc white (JIS No. 3): | 3 parts by weight |
| Stearic acid: | 2 parts by weight |
| Antioxidant*[4]: | 2 parts by weight |
| Powdered sulfur: | 2 parts by weight |
| Vulcanization accelerator*[5]: | 1 part by weight |

*[1]Wet master batch
*[2]Si69 (made by Degussa)
*[3]Not used when reinforcing filler is carbon black.
*[4]Santoflex 13 (made by Monsanto)
*[5]Santocure NS (made by Monsanto)

TABLE II-1

| | Ex. II-1 | | Ex. II-2 | Ex. II-3 | Ex. II-4 | Ex. II-5 | Ex. II-6 | Ex. II-7 | Comp. Ex. II-1 | | Comp. Ex. II-2 | |
| --- | --- | --- | --- | --- | --- | --- | --- | --- | --- | --- | --- | --- |
| Master batch used | Master batch 1 | | Master batch 2 | Master batch 3 | Master batch 4 | Master batch 5 | Master batch 6 | Master batch 7 | None (dry blend) | | None (dry blend) | |
| Type of filler | Modified carbon black 1*[1] | | Modified carbon black 2*[1] | Modified carbon black 3*[1] | Modified carbon black 4*[1] | Modified carbon black 5*[1] | Modified carbon black 6*[1] | Modified carbon black 7*[1] | Carbon black*[2] | | Silica*[3] | |
| Mixing time*[4] | 1 min. | 4 min. | 1 min. | 1 min. | 1 min. | 1 min. | 1 min. | 1 min. | 2 min. | 4 min. | 2 min. | 4 min. |
| Mixing state*[4] | No problem | No problem | No problem | No problem | No problem | No problem | No problem | No problem | Poor filler incorporation | No problem | Poor filler incorporation | No problem |
| tan δ (60° C.)*[5] | 0.162 | 0.160 | 0.162 | 0.163 | 0.163 | 0.159 | 0.161 | 0.161 | — | 0.186 | — | 0.159 |
| tan δ (0° C.)*[5] | 0.309 | 0.312 | 0.319 | 0.311 | 0.313 | 0.314 | 0.314 | 0.320 | — | 0.305 | — | 0.310 |
| Abrasion resistance index*[6] | 102 | 103 | 108 | 107 | 105 | 103 | 102 | 104 | — | 100 | — | 76 |

*[1]See Table II-2.
*[2]Carbon black N339 (Seast KH, made by Tokai Carbon)
*[3]Nipsil AQ (made by Nihon Silica)
*[4]State observed after kneading by 1.5 liter Banbury mixer, simultaneously charging rubber and compounding agents (except vulcanization system), then discharging after predetermined time.
*[5]tan δ measured using viscoelasticity spectrometer made by Toyo Seiki Seisakusho under conditions of temperature of 0° C. or 60° C., static strain of 10%, dynamic strain of ±2%, and frequency of 20 Hz.
*[6]Measured using Lambourn abrasion tester under conditions of room temperature, a slip rate of 35%, and a load of 5 kg. The resultant mixtures were indicated indexed to one of the formulations of carbon black as 100. The larger the value, the better the abrasion resistance shown.

TABLE II-2

|  | Rubber reinforcing modified carbon black 1 | Rubber reinforcing modified carbon black 2 | Rubber reinforcing modified carbon black 3 | Rubber reinforcing modified carbon black 4 | Rubber reinforcing modified carbon black 5 | Rubber reinforcing modified carbon black 6 | Rubber reinforcing modified carbon black 7 |
|---|---|---|---|---|---|---|---|
| Type of carbon black | N339 | N339 | N339 | N339 | N339 | N339 | N339 |
| Silica content (%) | 10% | 1% | 1% | 1% | 1% | 1% | 1% |
| Type of water-dispersed silica | Made by sodium silicate and sulfuric acid | Commercial product ST-20 | Commercial product ST-C | Commercial product ST-S | Commercial product ST-20L | Commercial product ST-ZL | Commercial product ST-UP |
| Composite step | Adding to carbon in slurry state | Adding as aqueous solution for granulating, then granulating. | | | | | |

TABLE II-3

Properties of water-dispersed silica used

| Silica particle size (nm) | pH | $SiO_2$ (%) | $Na_2O$ (%) | Commercial grade name | Manufacturer |
|---|---|---|---|---|---|
| 15 | 9.8 | 20.4 | 0.16 | Snowtex 20 | Nissan Chemical |
| 15 | 8.7 | 20.3 | 0.0003 | Snowtex C | Nissan Chemical |
| 10 | 9.7 | 30.4 | 0.40 | Snowtex S | Nissan Chemical |
| 50 | 10.9 | 20.3 | 0.12 | Snowtex 20L | Nissan Chemical |
| 76 | 9.3 | 40.2 | 0.00056 | Snowtex ZL | Nissan Chemical |
| 20 (linear) | 10.3 | 20.3 | 0.28 | Snowtex UP | Nissan Chemical |

INDUSTRIAL APPLICABILITY

As is clear from the results of Table I-1 and Table I-2, in the Examples using the granulated modified carbon black for rubber reinforcement produced and granulated by the method according to the present invention, a rubber composition is obtained with an excellent abrasion resistance and low electric resistance while being provided with the property of silica of a low tan δ at a high temperature (60° C.) and a high tan δ at a low temperature (0° C.) compared with the Comparative Examples, that is, Comparative Examples 1 and 2. That is, according to the present invention, it is possible to produce a rubber composition containing modified carbon black for rubber reinforcement which, when used as a tread rubber for a tire, for example, has a high grip, is superior in fuel economy, is excellent in abrasion resistance, and is free from the radio noise and adverse influence on electronic equipment due to a high electric resistance—by a simpler process and a lower cost compared with the prior art.

As is clear from the results of Table II-1, the process of production of a rubber composition containing a rubber reinforcing carbon black modified with a water-dispersed silica according to the present invention enables production by the same method as with and simpler and cheaper than with an ordinary carbon master batch. The composition obtained also has a lower tan δ at a high temperature (60° C.) and is not lower in abrasion resistance compared with carbon black.

The invention claimed is:

1. A process of producing a rubber composition containing a modified carbon black for rubber reinforcement comprising:
    mixing (a) 100 parts by weight, in terms of a solid content, of a diene rubber latex and (b) 10 to 250 parts by weight, in terms of a solid content, of a slurry containing a water-dispersed silica and a carbon black for rubber reinforcement; and
    coagulating the resultant mixture with a coagulator.

2. A process for producing a rubber composition as claimed in claim 1, wherein the carbon black for rubber reinforcement before deposit ion or adhesion of silica is a general purpose furnace (GPF) to super-abrasion furnace (SAF) grade produced by an oil furnace method.

3. A process for producing a rubber composition as claimed in claim 1, wherein 10 to 200 parts by weight of a process oil, based upon 100 parts by weight of the diene rubber is further incorporated into the mixture.

4. A process for producing a rubber composition as claimed in claim 1, wherein the content of silica is 0.1 to 25% by weight based upon the weighi of the modified carbon black.

5. A process for producing a rubber composition comprising:
    mixing (a) 100 parts by weight, in terms of a solid content, of a latex of a diene rubber component and (b') 10 to 250 parts by weight of a modified carbon black produced wherein in the step of granulating a carbon black when producing the modified carbon black for rubber reinforcement granulating the carbon black in a granulator after or while adding water-dispersed silica to the carbon black and then,
    coagulating the resultant mixture with a coagulant.

6. A process for producing a rubber composition as claimed in claim 5, wherein the water-dispersed silica used for the production of the modified carbon black contains silica particles having a diameter of 1 to 100 nm and a sodium ion content of not more than 1.0% by weight, in terms of $Na_2O$.

7. A Process for producing a rubber composition as claimed in claim 5, wherein 10 to 200 parts by weight of a process oil, based upon 100 parts by weight of the diene rubber is further incorporated into the mixture before the coagulation.

8. A process for producing a rubber composition as claimed in claim 5, wherein the content of silica is 0.1 to 25% by weight, in terms of $SiO_2$, based upon the weight of the modified carbon black.

\* \* \* \* \*